United States Patent [19]

Toombs et al.

[11] 4,017,898
[45] Apr. 12, 1977

[54] METHOD AND APPARATUS FOR RECORDING AND REPRODUCING VIDEO SIGNALS

[75] Inventors: Harold G. Toombs, Sunnyvale; Royce R. Sullivan, San Jose, both of Calif.

[73] Assignee: Redlake Corporation, Santa Clara, Calif.

[22] Filed: Apr. 28, 1976

[21] Appl. No.: 681,347

Related U.S. Application Data

[63] Continuation of Ser. No. 513,996, Oct. 11, 1974, abandoned, which is a continuation-in-part of Ser. No. 315,336, Dec. 15, 1972, abandoned.

[52] U.S. Cl. .............................. 360/105; 360/104
[51] Int. Cl.² .................. G11B 21/22; G11B 5/54; G11B 5/48
[58] Field of Search ....... 360/103, 104, 105, 97–99

[56] References Cited

UNITED STATES PATENTS

| | | | |
|---|---|---|---|
| 3,349,384 | 10/1967 | Kohn | 360/104 |
| 3,368,210 | 2/1968 | Zimmer | 360/103 |
| 3,637,928 | 1/1972 | Poulett | 360/104 |

*Primary Examiner*—Robert S. Tupper
*Attorney, Agent, or Firm*—Schapp and Hatch

[57] ABSTRACT

The apparatus includes a transducer carrying frame having a spine and arms extending from the spine. A transducer is mounted at the foot of the spine and two sled bearings are mounted at the outer ends of the arms, to form a sled assembly which can slide over the recording surface of a magnetic recording disc with the contact face of the transducer and the bearing faces of the sled bearings contacting the recording surface. The sled assembly is attached to the outer, non-supported end of a cantilever leaf spring. When this cantilever leaf spring is undeflected it holds the sled assembly near the recording surface of the recording disc but out of contact with it. A presser foot is provided to press upon the sled assembly and thus deflect the first cantilever leaf spring and bring the sled assembly into recording and reproducing contact with the recording surface of the recording disc. The presser foot is mounted on a second cantilever leaf spring. A third cantilever leaf spring deflects the second cantilever leaf spring and urges the presser foot against a presser foot bearing mounted on the sled assembly, thus causing the transducer and the sled bearings to remain in contact with the recording surface of the recording disc. A lifting bar is provided which can forceably deflect the second cantilever leaf spring against the urging of the third cantilever leaf spring, thus withdrawing the presser foot from the sled assembly and allowing the first cantilever leaf spring to return to its undeflected position and withdraw the sled assembly from the recording surface of the disc. For recording or reproducing information on the recording surface, the lifting bar is withdrawn and the second cantilever leaf spring is deflected by the third cantilever leaf spring, thus depositing the sled assembly on the recording surface and very lightly pressing the sled assembly against the recording surface, the total head pressure against the disc being as little as 1.5 grams.

12 Claims, 13 Drawing Figures

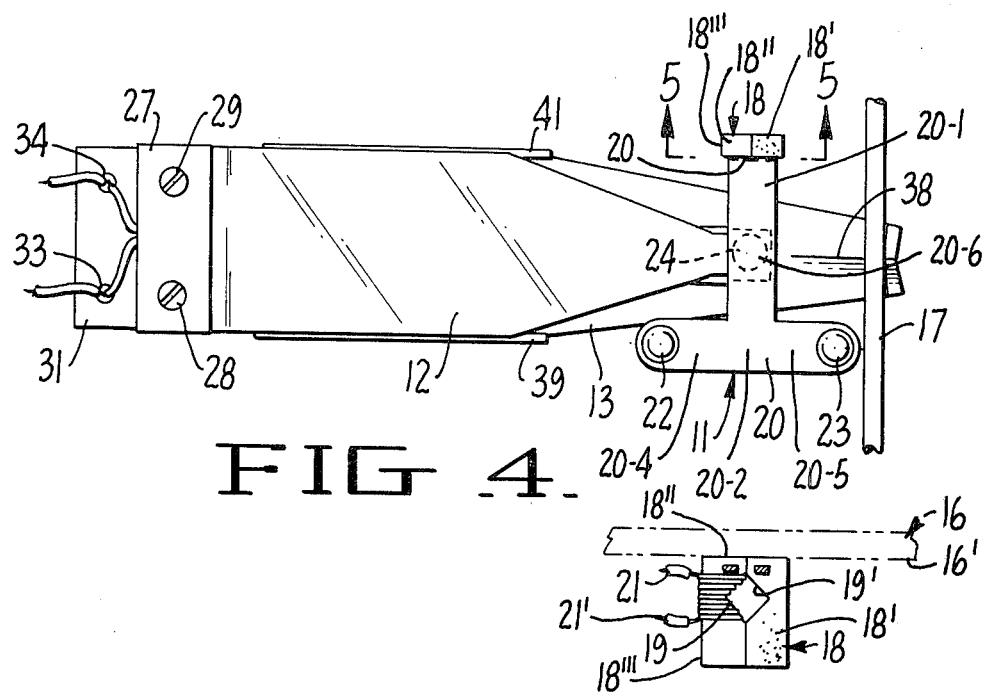
FIG. 4.
FIG. 5.
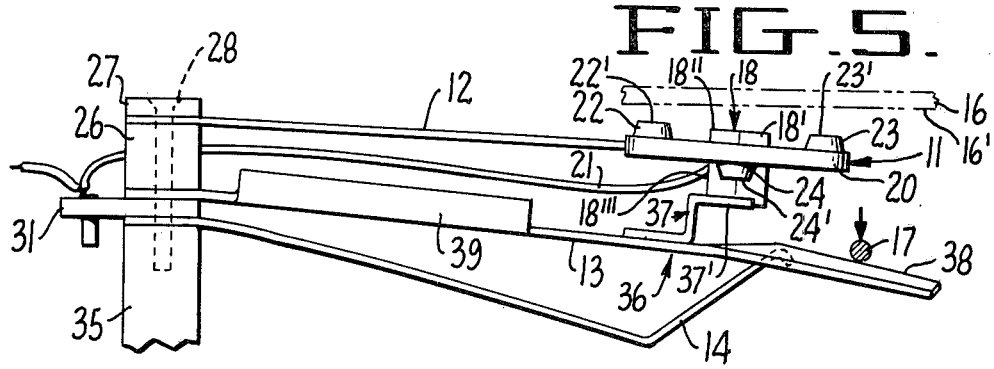
FIG. 6.
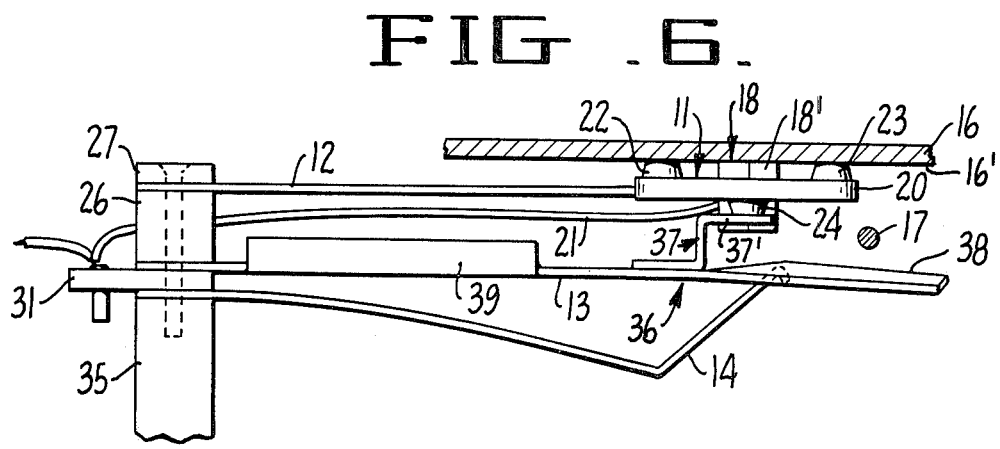
FIG. 7.

2

METHOD AND APPARATUS FOR RECORDING AND REPRODUCING VIDEO SIGNALS

CROSS-REFERENCE TO RELATED APPLICATION

This application is a continuation of U.S. Patent application Ser. No. 513,996, filed Oct. 11, 1974, which is a continuation-in-part of U.S. Patent application Ser. No. 315,336, filed Dec. 15, 1972, both now abandoned.

BACKGROUND OF THE INVENTION

1. Field of the Invention

The present invention relates to method and apparatus for recording and reproducing video and other broadband signals, and more particularly to method and apparatus for recording and reproducing such signals on a magnetic recording disc or the like with good fidelity, high signal strength, and long disc life.

2. Description of the Prior Art

Electromagnetic transducer heads for video recording operation in contact with a moving magnetic recording disc, sometimes called "contact video heads", are well known in the prior art. The contact video heads of the prior art have in general been so massive or required such high head pressures, or both, that they have been characterized by very short service life, or have abraded and destroyed their associated recording surfaces in a short time, or both. For contact video recording, the contact heads of the prior art have made it necessary to use only recording discs in which a wear protecting layer overlies the magnetizable material in which the video information is stored. As is well known, such wear protecting layers reduce the strength of the signal which can be recorded on and reproduced from the recording disc; particularly when, as is sometimes the case, such layers approximate to the recording head gap width in thickness. In addition, as is known in the art, organic protective layers may decrease the planarity of the recording surface as compared with the planarity of the uncoated disc, and thus worsen the problem of tracking by the contact video head. Yet further it is also known in the art that such protective layers sometimes wear off as a powder, which, to cite but one problem created thereby, may adhere to the contact face of the head and even further increase the gap between the head and the magnetic recording layer. Finally, the heat necessary to produce oxide protective layers sometimes warps or otherwise damages the disc. As an additional prior art disadvantage, it is noted that the sled bodies of most if not all of the contact video recording heads of the prior art have been flat plates or the like of such large area as to experience severe buffeting due to the air turbulence produced by the moving surface of the recording disc, resulting in seriously shortened recording disc life, head damage, or both.

SUMMARY OF THE INVENTION

Accordingly, it is an object of the present invention to provide a contact video head assembly for operation in contact with a moving magnetic recording surface, which assembly is of very low mass and requires very low head pressure against the recording surface, resulting in greatly extended head life, disc life or both.

Another object of the present invention is to provide contact video heads capable of operating at such light head pressures that their associated magnetic recording surfaces need not be provided with a protective layer or coating, thus avoiding the serious problems of signal reduction, planarity reduction, powdering, and disc warping set out hereinabove.

A further object of the present invention is to provide a contact video recording head in which the parts, and particularly the transducer-carrying sled frame, are of such shape and size as to minimize buffeting by turbulent air currents produced by the motion of the recording surface, and thus substantially eliminate head crashing and the associated shortening of disc and head life. In other words, the sled frame of the present invention has such aerodynamic characteristics as to constitute a good airfoil for flying close to the surface of the recording disc. Or, put differently, the sled frame of the invention is a good terrain follower, viewing it from the aerodynamic point of view.

An additional object of the present invention is to provide video recording apparatus having long contact head and disc life from which recorded video signals may be reproduced with high signal intensity and fidelity.

Yet another object of the present invention is to provide a method of recording video information on a movable recording surface comprising novel steps whereby extended disc and head life, along with high signal intensity and fidelity, are simultaneously achieved.

Other objects of the present invention will in part be obvious and will in part appear hereinafter.

The present invention, accordingly, comprises the several steps and the relation of one or more of such steps with respect to each of the others, and the apparatus embodying features of construction, combinations of elements, and arrangements of parts which are adapted to effect such steps, all as exemplified in the following detailed disclosure, and the scope of the present invention will be indicated in the appended claims.

In accordance with a principal feature of the present invention the sled body of a contact video recording head comprises an open frame having a spine and a plurality of arms projecting therefrom, the transducer and recording surface contacting bearings being affixed to said frame.

In accordance with said principal feature of the present invention, said spine and said arms are as lightly constructed as possible, and are not substantially wider than the major dimension of said transducer parallel to said recording surface.

In accordance with yet another aspect of the present invention, said spine and said arms may take the form of high-strength beam members, such as tubular members.

In accordance with an additional aspect of the present invention, a contact video recording head comprises a sled assembly, a substantially planar pressure plate for pressing said sled assembly against its associated recording surface, and pressure plate orienting means for maintaining said pressure plate parallel to said recording surface when said sled assembly is in contact therewith.

In accordance with a still further aspect of the present invention, said planar pressure plate bears against a bearing mounted on said sled assembly, said pressure plate contacting said sled assembly only by way of said bearing.

In accordance with another aspect of the present invention, a contact video recording head comprises a transducer carrying sled assembly, first cantilever leaf spring means supporting said sled assembly, a pressure plate for pressing said sled assembly against an associated recording surface, second cantilever leaf spring means for maintaining said pressure plate above said sled assembly, and third cantilever leaf spring means for causing said pressure plate to press against the sled assembly and thus press said sled assembly against said recording surface.

In accordance with a further aspect of the present invention, a contact video recording disc is provided, comprising a substrate and a magnetizable surface layer on said substrate, said magnetizable surface layer being unprotected from direct contact by a contact transducer head recording or reproducing information thereon.

In accordance with another aspect of the present invention, video information is recorded on a movable recording surface by depositing a transducer carrying sled assembly on said recording surface for recording information thereon, confining said sled assembly between said recording surface and a plane substantially parallel thereto, constraining said sled assembly to remain in substantially the same position against the urging of the moving recording surface resiliently urging said plane toward said recording surface and thereby pressing said sled assembly against the moving recording surface and exciting said transducer with signals representing information to be recorded on said recording surface.

In accordance with another feature of the present invention, said first, second and third cantilever leaf spring means are of such size and so shaped as to reduce buffeting due to turbulent air currents produced by the motion of the recording surface with respect to ambient air.

For a fuller understanding of the nature and objects of the invention, reference should be had to the following detailed description, taken in connection with the accompanying drawings.

BRIEF DESCRIPTION OF THE DRAWINGS

FIG. 4 is a plan view of the video recording device of FIG. 3;

FIG. 5 is an enlarged elevational view of the transducer of the first preferred embodiment of the present invention;

FIG. 6 is an enlarged elevational view of the device of said first preferred embodiment of the present invention in its inactive state (i.e., with the transducer withdrawn from the recording disc);

FIG. 7 is an elevational view of the device of said first preferred embodiment of the present invention;

DESCRIPTION OF THE PREFERRED EMBODIMENTS

Figure 1:
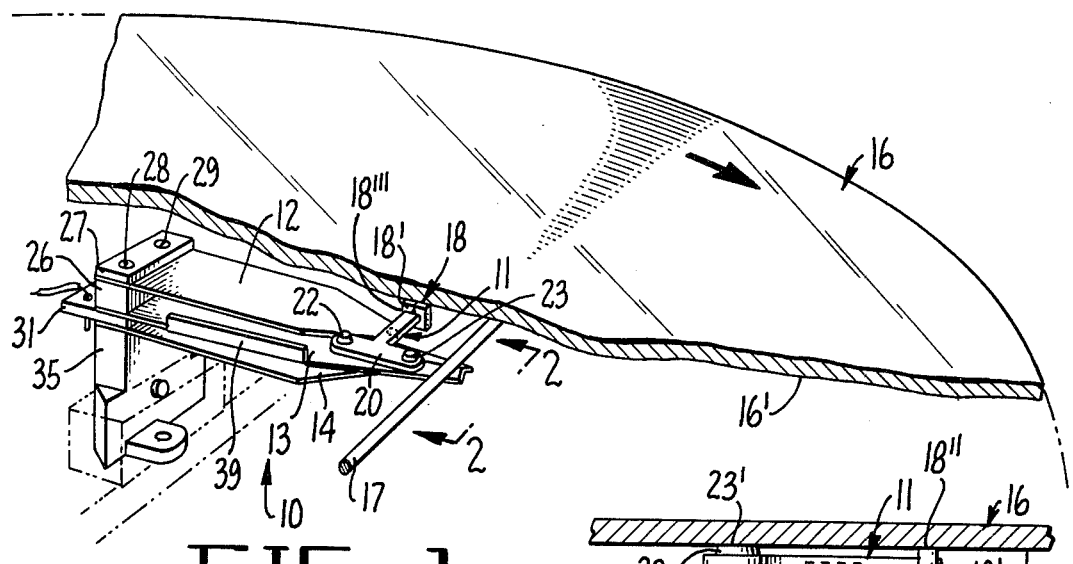
FIG. 1 is a fragmentary perspective view of a video recording device constructed in accordance with a first preferred embodiment of the present invention.

Referring now to FIG. 1, there is shown a part of a contact video recording device constructed in accordance with a first preferred embodiment of the present invention.

The contact video recording device of FIG. 1 includes an electromagnetic transducer assembly or head 10 comprising a sled assembly 11. Sled assembly 11 is resiliently supported by a cantilever leaf spring 12 which is sometimes herein called the sled carrier spring.

Two additional cantilever leaf springs 13, 14, which constitute particular structural features of the present invention, cooperate to press sled assembly 11 against the recording surface 16' of a rotating magnetic recording disc 16 for selectively recording or playing back video signals or other broadband signals on magnetic recording disc 16. A lifting bar or bail 17 is engageable with the tip of cantilever leaf spring 13 to deflect cantilever leaf spring 13 away from recording surface 16' thus permitting sled carrier spring 12 to withdraw sled assembly 11 from contact with recording surface 16'.

In a preferred embodiment of the present invention leaf spring 12 may be so adjusted as to deflect away from surface 16' with a force of about 0.25 grams; leaf spring 13 then being adjusted so as to exhibit neutral bias, i.e., no deflection force, either toward surface 16' or away from it; and leaf spring 14 then being adjusted so as to deflect toward surface 16' with a force between 1.5 and 1.8 grams. In the net, then, it will be seen that if spring 14 is removed head 18 will not contact surface 16'.

The movement of lifting bar 17 may be controlled manually or by any suitable means such as solenoids (not shown), all within the scope of the present invention. Magnetic recording disc 16 may be mounted upon and rotated by suitable means of the kind well known to those having ordinary skill in the art.

Electromagnetic transducer assembly 10 may be mounted on suitable transport means of the kind well known to those having ordinary skill in the art, whereby electromagnetic transducer assembly 10 is translated along a path extending radially from the center of magnetic recording disc 16 during the process of recording or reproducing video information on recording surface 16'.

Figure 3:
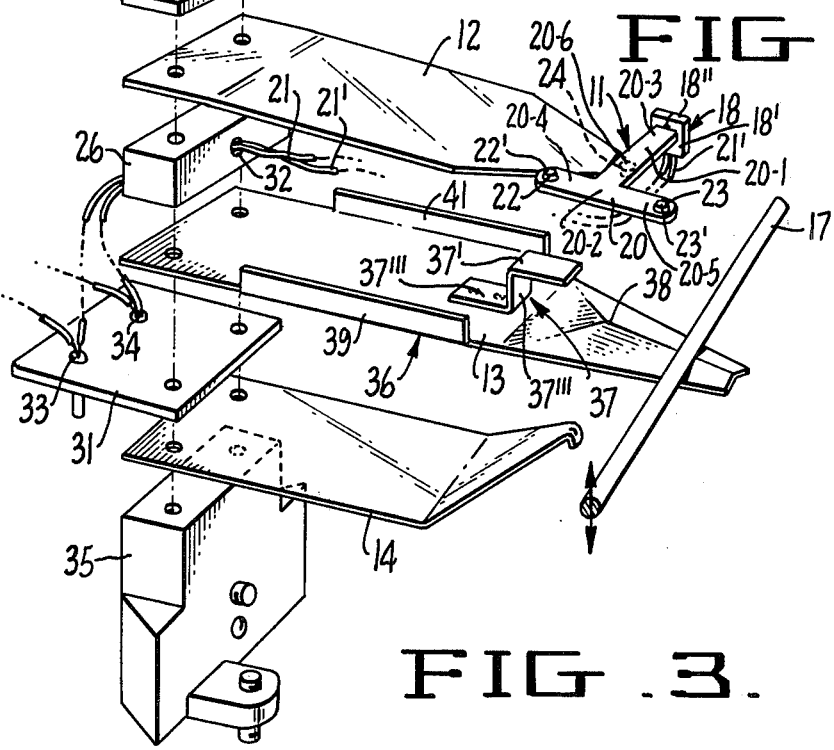
FIG. 3 is an enlarged exploded perspective view of the video recording device of FIG. 1.

As best seen in FIG. 3, sled assembly 11 comprises a transducer 18 having a core 18' (e.g., a ferrite core). Going to FIG. 8, it will be seen that a multi-turn winding 19 is wound on core 18', every turn of winding 19 passing through an opening 19' in core 18'.

Returning to FIG. 3, it will be seen that transducer 18 is mounted on a thin, flat frame 20, sometimes called the sled frame herein. Sled frame 20, which is a particular structural feature of the present invention, generally comprises a spine 20-1 having a head portion 20-2 and a foot portion 20-3. A pair of arms 20-4, 20-5 extend generally outwardly from the head area 20-2 of frame 20. The central portion of spine 20-1 is sometimes herein referred to as the waist of sled frame 20, being generally designated by the reference number 20-6.

In accordance with a particular feature of the present invention, transducer 18 is buttedly affixed to the foot 20-3 of sled frame 20, rather than being surrounded by the member which supports it, as was the practice in the prior art.

In accordance with the teachings of the present invention, spine 20-1 of sled frame 20 is no wider than transducer core 18', as shown for instance in FIG. 4.

The general configuration of sled frame 20 as shown and described herein, in marked contrast with the large area sled body plates which characterize the prior art (see, for instance, U.S. Pat. Nos. 3,022,494; 3,349,384; and 3,637,928), makes possible a very small and light sled assembly, characterized by low reaction to the turbulence of the ambient air, which can be operated in contact with the recording surface of a magnetic recording disc or the like unprovided with a conventional wear protecting coating for recording video or other broadband signals over a long service life, e.g., 500 hours.

As seen in FIG. 5, transducer winding 19 is provided with a pair of leads 21, 21' adapted for conveying video signals or other broadband signals to and from transducer winding 19. Winding 19 may in some applications be replaced with two or more windings, which may in some cases be provided with more than two leads, all as well understood by those having ordinary skill in the art.

Referring again to FIG. 3, it will be seen that a very small bearing 22 is affixed to the face of sled frame arm 20-4 opposite cantilever leaf spring 13, near the outer end of arm 20-4. Similarly, a very small bearing 23 is affixed to arm 20-5 of sled frame 20, on the side opposite cantilever leaf spring 13, near the outer end of arm 20-5. Bearings 22 and 23 may, for instance, be low friction industrial saphires. Other well known low friction bearing materials capable of being fabricated in the form of the very small bearings which typify one aspect of the present invention, such as ruby, may also be employed. In certain embodiments of the present invention bearings 22 and 23 are lapped in the process of their manufacture, producing flat faces 22 and 23' (FIG. 3).

As may also be seen in FIG. 3, a face 18" of transducer core 18' is substantially co-planar with bearing faces 22' and 23'. This condition may be produced, for instance, by the lapping process just referred to. Thus, as may be understood from FIG. 2 the bearing faces 22' and 23' of bearings 22 and 23, and the contact face 18" of transducer core 18', contact the recording surface 16' of magnetic recording disc 16 when sled assembly 11 is brought into operative recording contact with magnetic recording disc 16. Face 18" will preferably be as small as possible to reduce lift by air trapped between face 18" and surface 16'.

Comparing FIGS. 6 and 7 with FIG. 4, it will be seen that an additional very small bearing 24 is affixed to sled frame 20 at waist portion 20-6, on the side of sled frame 20 adjacent leaf spring 13. Bearing 24 is sometimes called herein the pressure plate bearing or presser foot bearing, and is a particular feature of the present invention, making it possible to apply the tracking force to the waist 20-1 of sled frame 20 only. Bearing 24 may be provided with a flat face 24', as indicated in FIG. 6, or may, in accordance with a particular feature of the present invention, be domed as is bearing 124 in FIG. 12. The very small size of bearing 24 is in accordance with one aspect of the present invention.

As shown in FIG. 3, sled carrier spring 12 is mounted on a spacing block 26, and is held there by a clamping block 27 and screws 28 and 29. Cantilever leaf spring 13 is mounted between spacing block 26 and a terminal board 31. The transducer coil leads 21, 21' pass through a hole 32 in spacing block 26, and thence through holes 33 and 34 of terminal board 31. As will be evident to those having ordinary skill in the art, terminal connectors may be mounted in said holes 33 and 34, and leads 21, 21' terminated thereat, the further connection between coil 19 and its associated signal source, output amplifier, or the like, being provided by additional wires or cables.

As also shown in FIG. 3, cantilever leaf spring 14 is mounted between terminal board 31 and a mounting block 35, being retained there by screws 28 and 29.

In the operation of the present invention, sled assembly 11 is resiliently urged toward recording surface 16' during recording and playback by the action of presser foot assembly 36. Presser foot assembly 36 comprises a presser foot 37 which, in the first preferred embodiment, is a strip of metal bent to form a pressure plate 37', a mounting tab 37", and an intermediate shank 37'''. Presser foot assembly 36 also comprises the aforedescribed cantilever leaf spring 13 which will sometimes hereinafter be called the presser foot carrier spring. As seen in FIG. 3, mounting tab 37" of presser foot 37 is affixed to presser foot carrier spring 13, as by spot welding.

Figure 2:
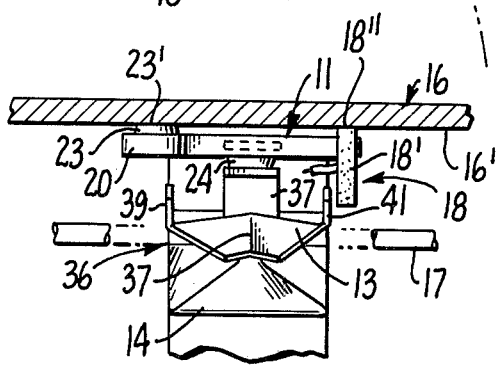
FIG. 2 is an enlarged fragmentary vertical sectional view taken on line 2—2 of FIG. 1.

As illustrated in FIGS. 2, 6 and 7, presser foot assembly 36 is so constructed and arranged that when sled assembly 11 is urged into contact with recording surface 16' by presser foot 37, pressure plate 36' is in contact with bearing 24, and no other part of presser foot assembly 36 is in contact with sled assembly 11. In accordance with a principal feature of the present invention, the configuration of presser foot 37 is such that pressure plate 37' is substantially parallel to recording surface 16' when sled assembly 11 is urged against recording surface 16' by presser foot assembly 36. In particular, it should be noted that in certain preferred embodiments of the present invention the plane of shank 37''' is not perpendicular to the plane of pressure plate 37'. In some embodiments, the plane of shank 37''' may not be perpendicular to the plane of mounting tab 37".

In accordance with another principal feature of the present invention, pressure plate 37' is of sufficiently large area so that bearing 24 can execute small sliding movements thereover, in response to minute deviations of recording surface 16' from perfect planarity, or in response to minute stretching of sled carrier spring 12 when rough portions of recording surface 16' pass sled assembly 11.

As best seen in FIG. 3, presser foot carrier spring 13 is tapered and crimped at its outer or free end to form an edge 38, so that the outer end of presser foot carrier spring 13 is rigidized, and so that lifting bar 17 contacts presser foot carrier spring 13 only at edge 38, thereby avoiding the introduction of an angulated or twisting component into the motion of sled assembly 11 as it is deposited against or withdrawn from recording surface 16'. Presser foot carrier spring 13 further comprises flanges 39 and 41 which negate lift under air flow conditions, i.e., create a permanently stalled attitude. Flanges 39 and 41 also prevent bending of spring 13 along its length bordered thereby, and thereby focus the bending of spring 13 in the vicinity of its contact with spacing block 26. Thus, stiffening flanges 39, 41 negate lift and maintain presser foot carrier spring 13 relatively flat.

In accordance with a further feature of the present invention, a major part of the pressure for pressing sled assembly 11 against recording surface 16' is provided by cantilever leaf spring 14, sometimes hereinafter called the pressure spring. As noted above, removal of leaf spring 14 will result in transducer 18 being drawn away from surface 16' by leaf spring 12.

When lifting bar 17 is in its inactive position (FIG. 7) it is preferable that spring 13 remain substantially parallel to spring 12.

When lifting bar 17 is moved from its inactive position (FIG. 7) to its fully deflected active position (FIG. 6), presser foot carrier spring 13 is deflected, and thus presser foot 37 is caused to retreat from recording disc 16. Thus, the pressure exerted by presser foot 37 on sled assembly 11 via bearing 24 is removed, and due to the predetermined bias imparted to sled assembly carrier spring 12 by initial adjusting at the time of assembly, sled assembly 11 is withdrawn from contact with recording surface 16', and recording or playback of information on disc 16 by means of contact video head 10 is prevented. Conversely, when lifting bar 17 is returned from its fully deflected active position (FIG. 6) to its inactive position (FIG. 7), presser foot carrier spring 13 is deflected toward magnetic recording disc 16 and presser foot 37, acting on bearing 24, urges sled assembly 11 toward magnetic recording disc 16', bringing bearing faces 22' and 23' and contact face 18'' of transducer core 18' into contact with recording surface 16', and pressing them against recording surface 16' with a total force of as little as 1.5 grams. It is to be understood that this very light total tracking force constitutes in itself an important accomplishment of the present invention, when compared with prior art total tracking forces, ranging, typically, from 6 to 40 grams. It is because of this extremely low total tracking force or head pressure that head lives of the order of 500 hours or more are achieved in commercial devices embodying the present invention, as contrasted with prior art devices having head lives of as little as 10 hours. Pressure spring 14 particularly contributes to this desirable property of the electromagnetic transducer head of the present invention, because its periodicity, as compared with the periodicities of springs 12 and 13, is such as to dampen the oscillations of those springs. Thus, in a preferred embodiment, sled carrier spring 12 may be constructed of brass and be approximately 1.7 mils thick, while presser foot carrier spring 13 is constructed of bronze and is approximately 4.5 mils thick, and pressure spring 14 is of phosphor-bronze and is about 2 mils thick.

It is further noteworthy that the leading edge 18''', FIG. 1 of transducer core 18' is arranged perpendicular to recording surface 16'. This aids in sweeping dust and other foreign matter before the head rather than between the transducer core 18' and recording surface 16'. The described construction also slices off minute nodules which almost invariably protrude from recording surface 16' when it is new.

Going now to FIGS. 8 through 12, there is shown a second preferred embodiment of the present invention. For ease of comparison of these embodiments, certain parts of the second preferred embodiment are given reference numerals such that by subtracting 100 therefrom the reference numeral of the corresponding part of the first preferred embodiment is obtained. Thus, it may be seen that cantilever leaf spring 114 of FIG. 8 corresponds to pressure spring 14 of FIG. 1. Similarly, it may be seen that transducer 118 of FIG. 8 corresponds to transducer 18 of FIG. 1. By repeated application of this same process of deduction a general understanding of the second preferred embodiment may be acquired from the above description of the first preferred embodiment, taking into account the following differences between these embodiments.

A particular feature of the second preferred embodiment which is not taught in connection with the first preferred embodiment is the use of an unprotected recording disc 116 consisting of a substrate 116'' on which is deposited a magnetic recording layer or coating 116''', which is devoid of any overlying protective coating to protect against mechanical wear by sled assembly 111.

Figure 12:
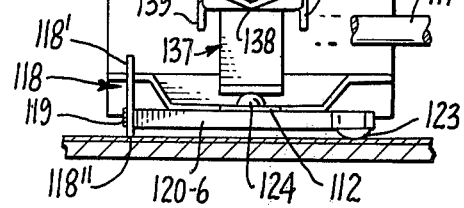
FIG. 12 is an elevational view of the device of said second preferred embodiment of the present invention, taken on line 12—12 of FIG. 8.

Referring to FIG. 12, and comparing it with FIG. 2, it will be seen that the presser foot bearing 124 of the second preferred embodiment is domed, rather than lapped to form a flat contact surface, as is the case with presser foot bearing 24 of the first preferred embodiment.

Thus, it will be seen that in accordance with a principal feature of the second preferred embodiment of the present invention, in which presser foot bearing 124 is domed, rocking motion of sled assembly 11 with respect to pressure plate 137' is accommodated. Domed bearing 124 also provides for the accommodation of small translational motions of sled assembly 111 parallel to the plane of pressure plate 137'. Thus, the domed presser foot bearing arrangement of the second preferred embodiment not only accommodates small translational movements of the sled assembly, as does the flat-topped bearing arrangement of the first preferred embodiment, but also accommodates rocking of the sled assembly with respect to the pressure plate, which rocking results from even the most perfectly manufactured discs produced by utilization of the most advanced techniques known in the art. It is believed that the highly successful operation of the second preferred embodiment is due in some substantial part to the incorporation therein of a domed presser foot bearing (124), and therefore it is to be understood that the provision of a domed presser foot bearing in an electromagnetic transducer assembly of the kind shown and described herein is a particularly advantageous feature of the present invention.

Figure 9:
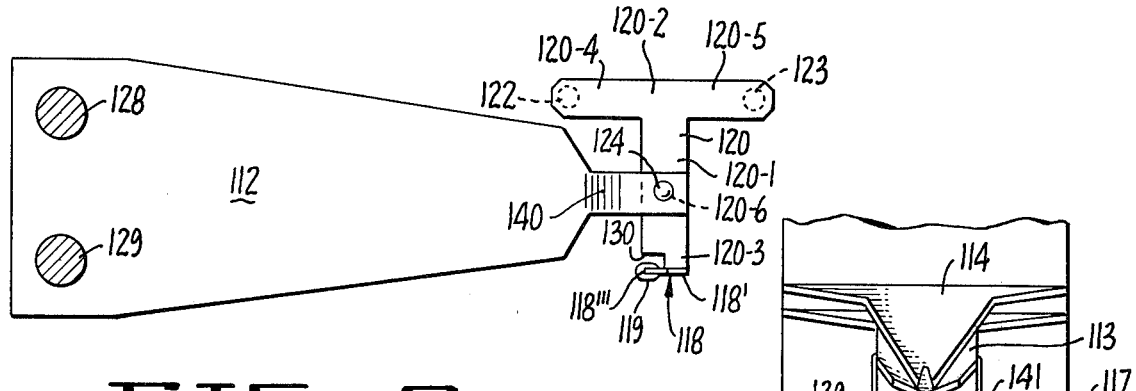
FIG. 9 is a plan view of the sled assembly carrier spring of said second preferred embodiment of the instant invention, taken on line 9—9 of FIG. 8.
Figure 10:
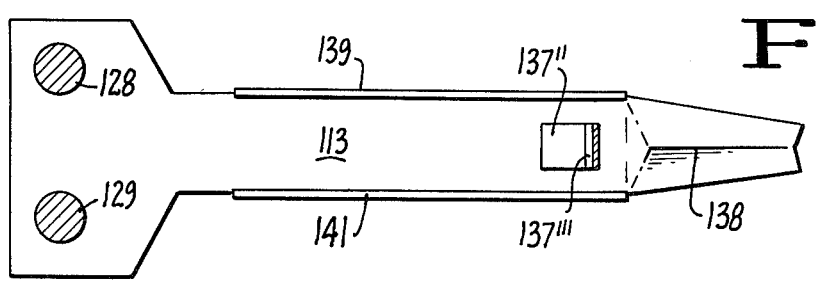
FIG. 10 is a plan view of the presser foot carrier spring of said second preferred embodiment of the present invention, taken on line 10—10 of FIG. 8.
Figure 11:
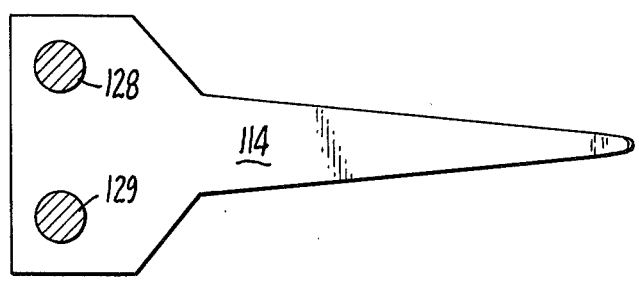
FIG. 11 is a plan view of the pressure spring of said second preferred embodiment of the present invention, taken on line 11—11 of FIG. 8.

Comparing FIGS. 9, 10 and 11 with FIG. 3, it will be seen that the three cantilever leaf springs 112, 113, 114 of the second preferred embodiment differ in shape from the corresponding cantilever leaf springs 12, 13, 14 of the first preferred embodiment. It is to be understood that the general shape and proportions of cantilever leaf springs 112, 113 and 114 correspond to the shape and proportions of the three cantilever leaf springs found in a successfully operating embodiment of the present invention which was characterized by such light tracking force that it could be operated in constant contact with a magnetic recording surface unprovided with any kind of wear protecting coating.

Figure 8:
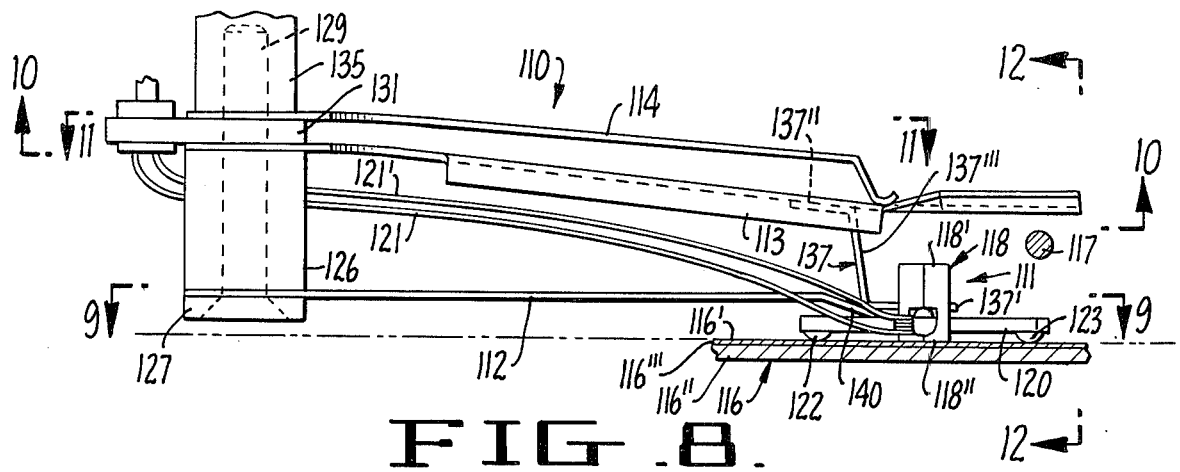
FIG. 8 is an elevational view of a device according to a second preferred embodiment of the present invention.

The extreme lightness and miniature size of the electromagnetic transducer assembly or contact video head of the present invention may be appreciated from the following dimensions of a typical embodiment. In this successful embodiment the sled carrier spring 112 was of the shape and proportions shown in FIG. 9, the maximum width of the spring being approximately 0.350 inches and the maximum length being approximately 0.925 inches. In this same embodiment the width of the narrow neck portion supporting sled assembly 111 was approximately 0.060 inches, and sled carrier spring 112 was fabricated from 0.001 inch brass shimstock. As seen in FIG. 8, the narrow neck portion 140 of sled carrier spring 112 is affixed to the surface of sled frame 120 opposite recording surface 116''. The corresponding dimensions of the other two cantilever leaf springs of this second preferred embodiment may be deduced by comparison of FIGS. 9, 10 and 11, presser foot carrier spring 113 being constructed of bronze and being about 4.5 mils thick, and pressure spring 114 being of phosphor-bronze about 2 mils thick.

As will be understood from these exemplary dimensions, and from the drawings, it is a particular feature of the present invention to provide mounting means for a contact transducer sled assembly which comprises three cantilever leaf springs of small surface area, rather than one or two cantilever leaf springs of considerably greater surface area. It is believed that the provision of a three-spring sled support assembly in accordance with the principles of the present invention greatly reduces the distressing and destructive phenomenon known in the art as "head crashing", i.e., the tendency of prior art contact video recording heads to oscillate widely in head pressure to the point of scoring or gouging the associated magnetic recording surface. The invention is believed to accomplish this by reducing the effects of buffeting. By "buffeting" is meant the aerodynamic effect on the sled assembly mounting means which is produced by turbulent air flow resulting from the high-speed surface motion of the disc with respect to the body of air environing the disc. Such turbulent air flow is particularly marked in apparatus of the class having flat, planar cover plates disposed closely adjacent the disc on both sides thereof. The commercial version of the present invention falls in that class. In such apparatus the air flow over the surface of the rotating disc exhibits four conditions: (1) The boundary layer departs from a laminar state as velocity increases and transitions to a turbulent boundary layer. (2) The depression in air pressure created at the inner radius of the disc invites air to build up at the outer radius and, confined by the cover plates, to flow back to the center of the disc, in which flow some of the air collides with that coming from the opposite direction, creating turbulence in the process. (3) The air flow pattern mentioned in (1) and (2) rotate in the same direction as the disc, with the exception of a few upper surface eddy currents moving in the reverse direction; and (4) the area of least turbulence exists immediately at the surface of the disc, its thickness varying very considerably from the inside of the disc to the outside of the disc. The region of laminar flow at the surface of the disc may be as little as 0.001 inch deep. It will be evident, then, from this very brief discussion of the turbulent flow phenomena involved, that a cantilever leaf spring supporting a transducer head is subjected to severe buffeting, much as though it were an aircraft wing exposed to the phenomenon sometimes called clear air turbulence. It has been the practice in the prior art to overcome the effect of such buffeting by increasing the static loading pressing the contact head against the magnetic recording surface of the disc. The necessary high levels of static loading have in the past, however, resulted in extremely short disc and head life, the effect being so severe that commercial video recording by contact heads has never really been satisfactory.

In the devices of the present invention the effect of buffeting is very greatly reduced by (1) supporting the contact transducer head by means of three cooperating cantilever leaf springs and (2) reducing the surface area of the sled frame and the three cantilever leaf springs to the greatest extent possible, particularly the sled frame. It is believed that the effectiveness of the spring support system of the invention in reducing the effects of buffeting is clear from the fact that a device constructed according to the second preferred embodiment functions well when the total head pressure by which it is maintained in contact with the associated magnetic recording surface is as little as 1.5 grams, contrasted with total head pressures of as much as 10 to 12 grams commonly found in the prior art. It is because of this extreme difference in total head pressure or tracking force that the commercial device constructed according to the second preferred embodiment is capable of cooperating with a magnetic recording disc which is unprovided with a wear protective coating throughout a useful service life of as much as 500 hours. Some devices of the prior art, by contrast, even when used with discs having wear protecting coatings, have a useful service life of as little as 10 hours in video contact recording service.

It is to be noted that the neck area 140 of sled carrier spring 112 is particularly sensitive to turbulent air flow conditions, and thus is made as small in surface area as possible. Similarly, shank 137''' of presser foot 137 is also made as small in area as mechanical considerations permit.

The particular configuration of presser foot 137 is best seen in FIG. 8. As there shown, the angle between mounting tab 137'' and shank 137''' is not a right angle, nor is the angle between shank 137''' and pressure plate 137' a right angle. It will also be observed from FIG. 8, however, that the configuration at presser foot 137 is such that, in accordance with a principal feature of the present invention, pressure plate 137' is substantially parallel to recording surface 116' when sled assembly 111 is pressed against recording surface 116' by presser foot 137.

It will also be seen in FIG. 8 that the device of the second preferred embodiment is adapted to coact with the top surface of magnetic recording disc 116. The device of the second preferred embodiment may, however, be adapted to coact with the bottom surface of a magnetic recording disc, just as the device of the first preferred embodiment may be adapted to coact with the top surface of a magnetic recording disc.

Figure 13:
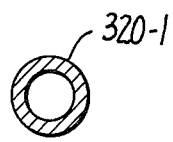
FIG. 13 illustrates an alternative embodiment of the sled frame of the present invention.

Further, it is to be understood in connection with the second preferred embodiment, as with the first preferred embodiment, that the spine and arms of sled frame 120 need not be solid and of rectangular cross-section. For example, spine 120-1 may be tubular and thus have a toroidal cross-section 320-1 (FIG. 13). Similarly, arms 120-4 and 120-5 may be of toroidal cross-section as shown in FIG. 13. Spine and arm members of other cross-sectional configurations also fall within the scope of the present invention.

Also, as may particularly be seen in FIG. 9, the width of spine 120-1 and the widths of arms 120-4, 120-5 are not substantially greater than the major horizontal dimension of transducer core 113'. Yet further, transducer core 118' is mounted flat against the foot 120-3 of spine 120-1, and does not pass through an opening in sled frame 120 as is the case with the transducer cores of prior art contact recording heads. These particular structural arrangements are to be understood as constituting a particular feature of the present invention.

It will be seen from the above, that the present invention, and particularly the second preferred embodiment, has been shown to make possible a new method of contact video recording wherein the contact video recording head is relatively moved over the magnetic material deposited on the surface of the disc in constant direct contact therewith, and without the interposition of a wear protecting coating.

The present invention, then, makes possible a new class of magnetic recording discs for use in contact video recording, which new class of magnetic recording discs are provided, in the usual manner, with magnetizable surface coatings, but which are not provided with wear protecting coatings over the magnetizable coatings. A particular embodiment of this new contact video recording disc invention is a contact video recording disc comprising a glass substrate on which is departed, e.g., by sputtering, a cobalt layer, or a layer comprised of nickel and cobalt.

It will thus be seen that the objects set forth above, among those made apparent from the preceding description, are efficiently attained, and, since certain changes may be made in carrying out the above method and in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:
1. An electromagnetic transducer assembly for the contact recording or reproducing of video information on a moving magnetic recording surface, comprising:
   electromagnetic transducer means having an active surface traversed by a head gap;
   first and second bearing means having smooth bearing surfaces;
   an open frame for maintaining said transducer means and said bearing means in such juxtaposition that said active surface and said smooth bearing surfaces can simultaneously contact said magnetic recording surface, said frame consisting of a first elongated member to a first end of which said transducer means is affixed, a second elongated member to a first end of which said first bearing means is affixed, and a third elongated member to a first end of which said second bearing means is affixed, said elongated members being united at their ends remote from said first ends and being unprovided with rigidifying means;
   first cantilever spring means for resiliently supporting said frame, transducer means, and bearing means near said moving magnetic recording surface but not in contact therewith and for maintaining the position of said frame against the urging of forces arising from contact between said transducer means and bearing means and said moving magnetic recording surface, said frame being attached to the free end of said first cantilever spring means; and
   second cantilever spring means resiliently urging said frame toward said moving magnetic recording surface and thus maintaining said transducer means and said bearing means in contact with said moving magnetic recording surface during the recording and reproducing of video information thereon.

2. An electromagnetic transducer assembly as claimed in claim 1, further comprising:
   additional bearing means disposed on the opposite side of said frame from said first and second bearing means;
   a substantially planar pressure plate disposed between said additional bearing means and said second cantilever spring means; and
   pressure plate orienting means for maintaining said pressure plate substantially parallel to said moving magnetic recording surface when said transducer means and said first and second bearing means are in contact with said moving magnetic recording surface, said pressure plate being attached to the free end of said pressure plate orienting means.

3. An electromagnetic transducer assembly as claimed in claim 1 in which none of said elongated members has a greater cross-section dimension than the greatest dimension of said transducer means parallel to said moving magnetic recording surface.

4. An electromagnetic transducer assembly as claimed in claim 3 in which said transducer means is located on the opposite side of said first cantilever spring means from said bearing means.

5. An electromagnetic transducer assembly as claimed in claim 1 in which said transducer means is located on the opposite side of said first cantilever spring means from said bearing means.

6. An electromagnetic transducer assembly as claimed in claim 5, further comprising:
   additional bearing means disposed on the opposite side of said frame from said first and second bearing means;
   a substantially planar pressure plate disposed between said additional bearing means and said second cantilever spring means; and
   pressure plate orienting means for maintaining said pressure plate substantially parallel to said moving magnetic recording surface when said transducer means and said first and second bearing means are in contact with said moving magnetic recording surface, said pressure plate being attached to the free end of said pressure plate orienting means.

7. An electromagnetic transducer assembly for the contact recording or reproducing of video information on a moving magnetic recording surface, comprising:
   a sled assembly including electromagnetic transducer means for recording or reproducing information on said surface;
   resilient supporting means for resiliently supporting said sled assembly near said recording surface but not in contact therewith;

a substantially planar pressure plate for pressing said sled assembly against said moving magnetic recording surface;

pressure plate orienting means for maintaining said pressure plate above said sled assembly and substantially parallel to said recording surface when said sled assembly is in contact therewith, said pressure plate being attached to the free end of said pressure plate orienting means;

a pressure spring for providing force acting on said pressure plate orienting means and directed toward said recording surface to cause said pressure plate to maintain said sled assembly in contact with said magnetic recording surface while said recording surface is moving with respect thereto; and a bearing mounted on said sled assembly and facing said planar pressure plate for sliding contact therewith, said pressure plate contacting said sled assembly only by way of said bearing.

8. An electromagnetic transducer assembly for the contact recording or reproducing of video information on a moving magnetic recording surface, comprising:

a sled assembly including electromagnetic transducer means for recording or reproducing information on said surface;

a substantially planar pressure plate for pressing said sled assembly against said moving magnetic recording surface;

pressure plate orienting means for maintaining said pressure plate above said sled assembly and substantially parallel to said recording surface when said sled assembly is in contact therewith, said pressure plate being attached to the free end of said pressure plate orienting means;

a first cantilever spring affixed to said sled assembly to retain said sled assembly under said pressure plate against the urging of said recording surface when said recording surface moves with respect to said electromagnetic transducer assembly;

a second cantilever spring for providing force acting on said pressure plate orienting means and directed toward said recording surface to cause said pressure plate to press said sled assembly against said recording surface while said recording surface is moving with respect thereto; and a bearing mounted on said sled assembly and facing said planar pressure plate for sliding contact therewith, said planar pressure plate contacting said sled assembly only by way of said bearing;

said sled assembly being mounted on the free end of said first cantilever spring means and said first cantilever spring means resiliently maintaining said sled assembly near said recording surface but not in contact therewith when the force of said second cantilever spring is not applied to said pressure plate orienting means.

9. An electromagnetic transducer assembly as claimed in claim 8 in which said pressure plate orienting means comprises a cantilever spring member.

10. An electromagnetic transducer assembly for the contact recording or reproducing of video information on a moving magnetic recording surface, comprising:

a transducer carrying sled assembly;

first cantilever leaf spring means for resiliently supporting said sled assembly near but not in contact with said surface, said sled assembly being attached to the free end of said first cantilever leaf spring means;

a pressure plate for pressing said sled assembly against said recording surface;

second cantilever leaf spring means for maintaining said pressure plate above said sled assembly, said pressure plate being affixed to the free end of said second cantilever leaf spring means; and third cantilever leaf spring means for providing force acting on said second cantilever leaf spring means and directed toward said recording surface to cause said pressure plate to press against said sled assembly and thus press said sled assembly against said recording surface while said recording surface is moving with respect thereto.

11. An electromagnetic transducer assembly for the contact recording or reproducing of video information on a moving magnetic recording surface as claimed in claim 10, further comprising a bearing mounted on said sled assembly, said pressure plate bearing against said bearing when said pressure plate presses said sled assembly into contact with said moving magnetic recording surface.

12. Contact video recording apparatus, comprising:

an unprotected magnetic recording surface which is substantially free from abrasion-protective coating material;

an electromagnetic transducer assembly for recording or reproducing video information on said unprotected magnetic recording surface when said unprotected magnetic recording surface is moved therepast and in contact therewith, including a transducer carrying sled assembly, first cantilever leaf spring means for resiliently supporting said sled assembly near said surfacr but not in contact therewith, said sled assembly being mounted on the free end of said first spring means, a pressure plate for pressing said sled assembly against said recording surface, and second cantilever leaf spring means for maintaining said pressure plate above said sled assembly, said pressure plate being affixed to said second cantilever leaf spring means;

means for moving said unprotected magnetic recording surface past said electromagnetic transducer assembly; and third cantilever leaf spring means for pressing said pressure plate against said sled assembly and thus maintaining said electromagnetic transducer assembly in contact with said unprotected recording surface as said unprotected recording surface moves past said electromagnetic transducer assembly and video signals are recorded on said unprotected recording surface by said electromagnetic transducer assembly.

* * * * *

UNITED STATES PATENT AND TRADEMARK OFFICE
CERTIFICATE OF CORRECTION

PATENT NO. : 4,017,898

DATED : April 12, 1977

INVENTOR(S) : Harold G. Toombs and Royce R. Sullivan

It is certified that error appears in the above-identified patent and that said Letters Patent are hereby corrected as shown below:

In the specification:

Column 1, line 43, "tracking" should be enclosed in quotation marks;
Column 1, line 44, "further" should be followed by a comma (,);
Column 2, lines 11 and 12, "head crashing" should be enclosed in quotation marks;
Column 2, line 15, "flying" should be enclosed in quotation marks;
Column 3, line 27, "surface resiliently" should be --surface, resiliently--;
Column 3, line 30, "recording surface" should be followed by a comma (,);
Column 11, line 7, "113'" should be --118'--;
Column 11, line 31, "departed" should read -- deposited --.

In the claims:

Claim 3, line 3, "cross-section" should be --cross-sectional--;
Claim 12, line 12, "surfacr" should be --surface--.

Signed and Sealed this twenty-sixth Day of July 1977

[SEAL]

Attest:

RUTH C. MASON
Attesting Officer

C. MARSHALL DANN
Commissioner of Patents and Trademarks